(12) United States Patent
Reilly (10) Patent No.: US 7,917,801 B2
(45) Date of Patent: Mar. 29, 2011

(54) SYSTEMS AND METHODS FOR MANAGING NETWORK COMMUNICATIONS

(75) Inventor: John R. Reilly, Roseville, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 292 days.

(21) Appl. No.: 12/328,624

(22) Filed: Dec. 4, 2008

(65) Prior Publication Data

US 2010/0146326 A1    Jun. 10, 2010

(51) Int. Cl.
*G06F 11/00* (2006.01)
(52) U.S. Cl. .......................................................... 714/4
(58) Field of Classification Search ................... 714/1–4, 714/6–9, 13, 15, 16, 20, 21, 37–39, 43
See application file for complete search history.

(56) References Cited

U.S. PATENT DOCUMENTS

| | | | |
|---|---|---|---|
| 6,854,069 B2 * | 2/2005 | Kampe et al. ...................... | 714/4 |
| 7,093,163 B2 * | 8/2006 | Kameyama et al. ............. | 714/21 |
| 7,206,972 B2 * | 4/2007 | Wilson et al. .................... | 714/43 |
| 7,461,290 B1 * | 12/2008 | Reynolds et al. ................. | 714/4 |
| 2002/0007468 A1 * | 1/2002 | Kampe et al. ...................... | 714/4 |
| 2005/0080887 A1 * | 4/2005 | Lee et al. ........................ | 709/223 |
| 2006/0056285 A1 * | 3/2006 | Krajewski et al. ............. | 370/216 |
| 2009/0109842 A1 * | 4/2009 | Reilly et al. .................. | 370/220 |

* cited by examiner

*Primary Examiner* — Nadeem Iqbal (57) ABSTRACT

First and second management systems are placed in active and standby modes, respectively. The first and second management systems are configured to be in communication with the second and the first management systems, respectively and with a plurality of network devices. A first number of the plurality of network devices in communication with the first management system is determined at the first management system and transmitted to the second management system. A second number of the plurality of network devices in communication with the second management system is determined at the second management system and transmitted to the first management system. A first determination is made regarding whether the first number of network devices is less than the second number of network devices at the first management system. A second determination is made regarding whether the first number of network devices is less than the second number of network devices at the second management system. The first and second management systems are placed in failure mode and active mode, respectively based on the first and second determinations.

20 Claims, 6 Drawing Sheets

FIG. 3 (con't)

FIG. 4

FIG. 4 (con't)

FIG. 5

SYSTEMS AND METHODS FOR MANAGING NETWORK COMMUNICATIONS

FIELD OF THE INVENTION

The present invention generally relates to network management and more particularly to managing communication relating to connectivity failures in a network.

BACKGROUND OF THE INVENTION

Technological advances have led to the use of increasingly larger and complex networks with an ever increasing number of network systems as an integral part of organizational operations. Such networks often utilize multiple management systems that communicate with and manage hundreds of network devices. Examples of such network devices, include, but are not limited to interface devices and fabric devices.

Communication related connectivity issues between management systems and network devices sometimes lead to disruptions in network operations. In some cases, troubleshooting such issues are often time consuming and result in the creation of a significant burden on network administrator time and energy.

SUMMARY OF THE INVENTION

One aspect of the invention is directed to a method of managing network communications. First and second management systems are placed in active and standby modes, respectively. The first and second management systems are configured to be in communication with the second and the first management systems, respectively and with a plurality of network devices. A first number of the plurality of network devices in communication with the first management system is determined at the first management system and transmitted to the second management system. A second number of the plurality of network devices in communication with the second management system is determined at the second management system and transmitted to the first management system. A first determination is made regarding whether the first number of network devices is less than the second number of network devices at the first management system. A second determination is made regarding whether the first number of network devices is less than the second number of network devices at the second management system. The first and second management systems are placed in failure mode and active mode, respectively based on the first and second determinations. Another aspect of the invention is directed to a computer readable medium storing a computer executable program for managing network communications. Yet another aspect of the invention is directed to a system for managing network communications.

DETAILED DESCRIPTION OF THE DRAWINGS

Figure 1:
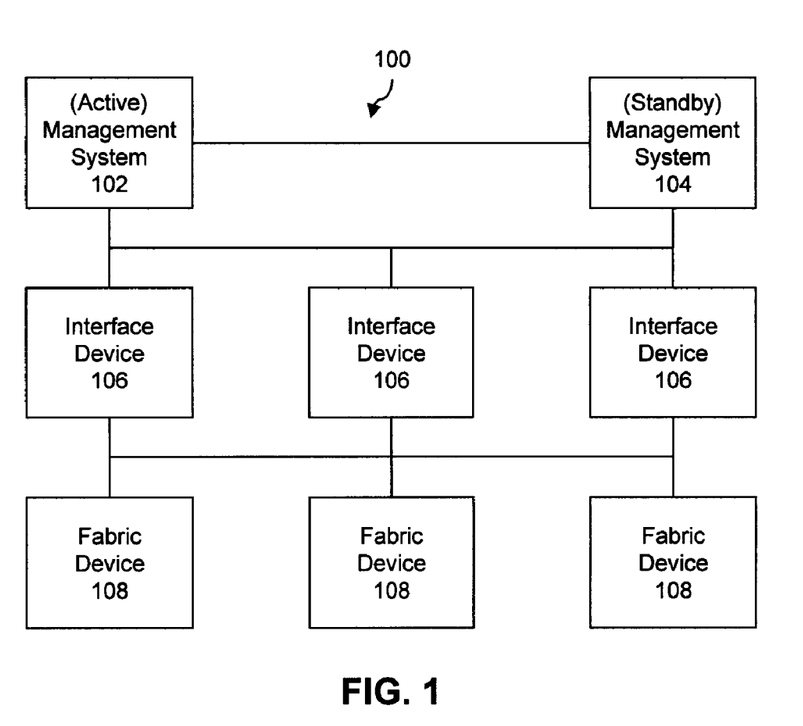
FIG. 1 is a block diagram representation of an example of a system that may be used to implement one embodiment of managing network communications.

Referring to FIG. 1 a block diagram representation of an example of a system 100 that may be used to implement one embodiment of managing network communications is shown. The system 100 generally includes a first management system 102 communicatively coupled to a second management system 104. Both the first and second management systems 102, 104 are communicatively coupled to a plurality of network devices 106, 108. Examples of network devices include, but are not limited to, interface devices 106 and fabric devices 108. Each of the first and second management modules are communicatively coupled to three interface devices 106 and to three fabric devices 108.

Each of the management systems 102, 104 can be placed in one of an active mode, a standby mode and a failover mode. In active mode, the management system 102 generally communicates with and manages the network devices 106, 108. In failover mode, the management system 102, 104 ceases all communications with network devices 106, 108 and management operations. In standby mode, the management system 104 is configured to communicate with the network devices 106, 108 and assume control in the event the management system 102 in active mode encounters communication connectivity problems with the network devices 106, 108 and is switched over to failover mode. A management system 102 that has been placed in active mode will also be referred to as an active management system 102 and a management system 104 that has been placed in standby mode will also be referred to as a standby management system 104. It should be noted that while one example of a system 100 has been described, alternative forms of systems including a fewer or greater number of network devices 106, 108 may be used. Furthermore, while the illustrated system 100 has been described as including interface devices 106 and fabric devices 108, other types of network devices may be used in the system.

Figure 2:
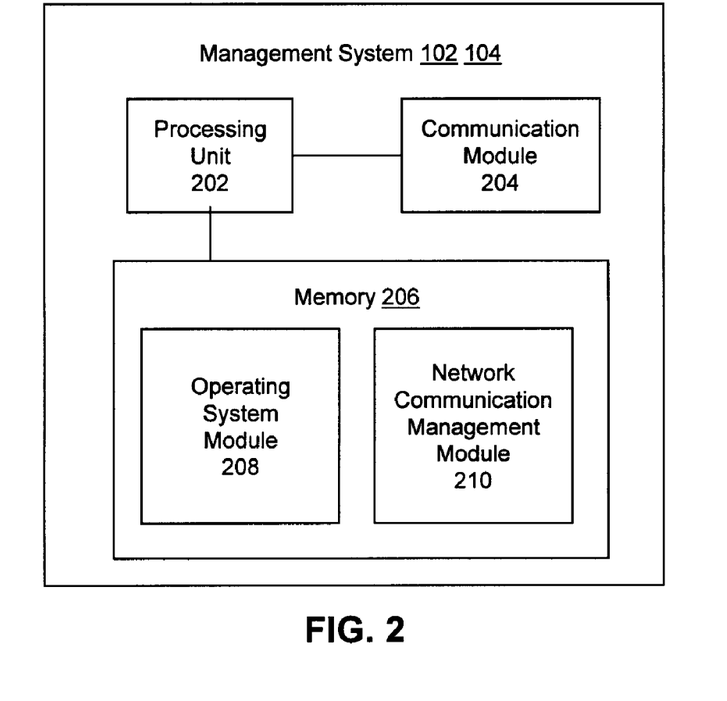
FIG. 2 is a block diagram representation of one embodiment of a management system.

Referring to FIG. 2, a block diagram representation of one embodiment of a management system 102, 104 is shown. The management system 102, 104 generally includes a processing unit 202, a communication module 204, and a memory 206. The processing unit 202 includes a processor or controller. The communication module 204 facilitates communications between the management system 102, 104 and other devices. Examples of such devices include, but are not limited to, other management systems 102, 104 and network devices 106, 108. In one embodiment, the communication module 204 supports communication via a networking infrastructure. In one embodiment, the communication module 204 supports communication via the Internet. In one embodiment, the communication module 204 supports wireless communication. In one embodiment, the communication module 204 supports wired communication. In one embodiment, the communication module 204 supports a combination of wireless and wired communication.

In one embodiment, an operating system module 208 and a network communication management module 210 are stored in the memory 206. The network communication management module 210 generally coordinates operations involving the use of a redundant management systems 104 where a first management system 102 is placed in active mode and a second management system 104 is placed in standby mode. More specifically, the network communication management module 210 monitors communication connectivity between the management systems 102, 104 and the network devices 106, 108. In the event, the network communication management module 210 detects communication connectivity problems between the active management system 102 and the network devices 106, 108, the network communication management module 210 facilitates the transition of the active management system 102 from active mode to failover mode and transition of the standby management system 104 from standby mode to active mode. In one embodiment, the network communication management module 210 alerts the administrator in the event the standby management system 104 encounters communication connectivity problems with network devices 106, 108. Alternative embodiments of the management system 102, 104 may include additional modules that facilitate the operation of the management system 102, 104.

In one embodiment, the memory 206 includes one or more of a non-volatile memory, a volatile memory, and/or one or more storage devices. Examples of non-volatile memory include, but are not limited to, electrically erasable programmable read only memory (EEPROM) and read only memory (ROM). Examples of volatile memory include, but are not limited to, static random access memory (SRAM), and dynamic random access memory (DRAM). Examples of storage devices include, but are not limited to, hard disk drives, compact disc drives, digital versatile disc drives, and flash memory devices. The processing unit 202 generally retrieves and executes machine readable instructions or software programs that are stored in the memory 206.

Figure 3:
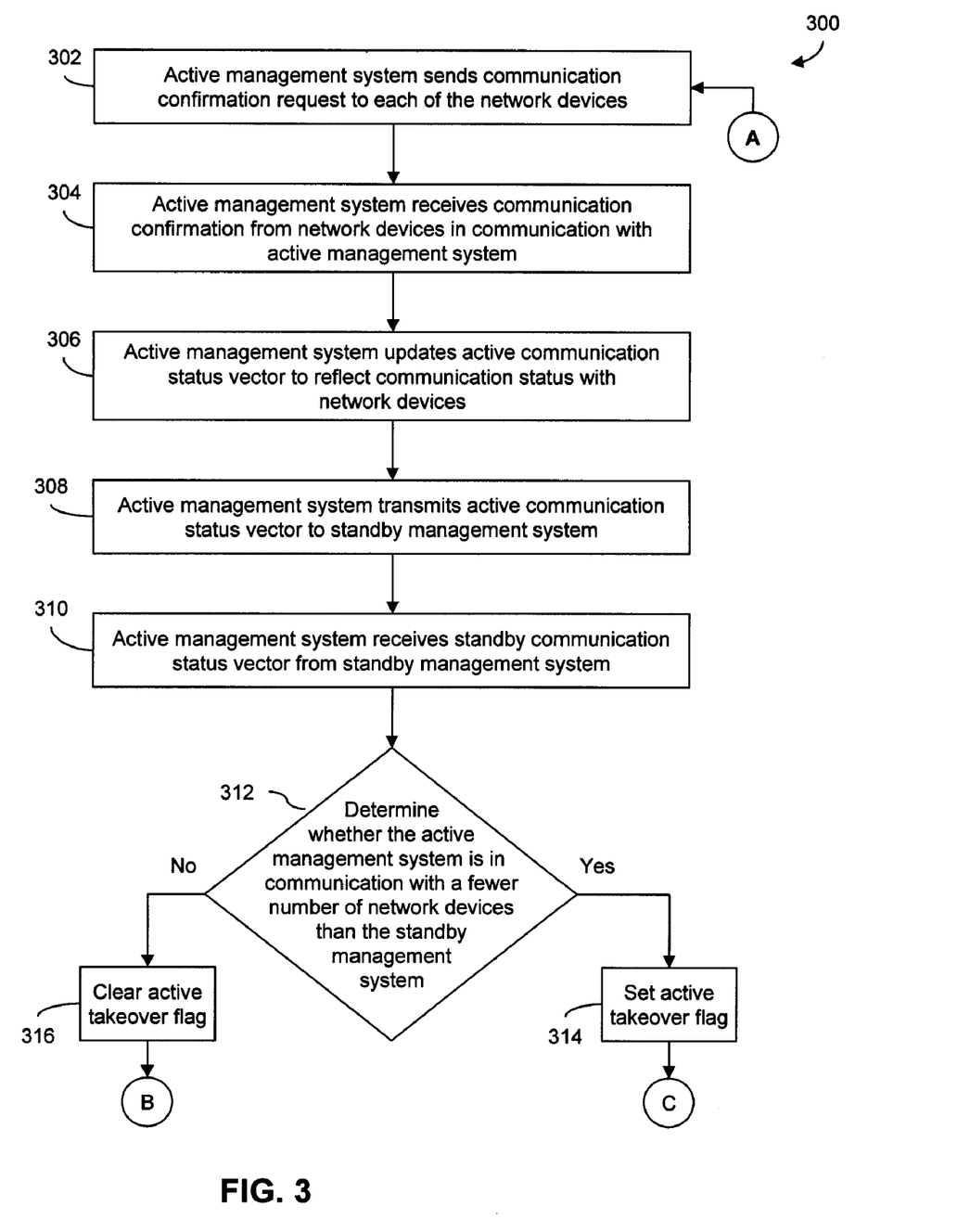
FIG. 3 is a flowchart representation of one embodiment of a method of managing network communications from a management system that has been placed in active mode.

Referring to FIG. 3, a flowchart representation of one embodiment of a method 300 of managing network communications from a management system 102 that has been placed in active mode is shown. The active management system 102 periodically polls the network devices 106, 108 to determine the communication connectivity status of the network devices 106, 108 with respect to the active management system 102. The active management system 102 and the standby management system 104 periodically exchange communication connectivity data and the active management system 102 assesses the communication connectivity status of the active management system 102 and the standby management system 104.

In one embodiment, the communication connectivity assessment is performed by the active management system 102 every network device polling cycle. In one embodiment, the communication connectivity assessment is performed by the active management system 102 following two of more network device polling cycles. In one embodiment, periodic communication connectivity assessment is performed at the active management system 102 in accordance with a first timer and the active management system 102 network device polling is performed in accordance with a second timer where the first timer bears an asynchronous timing relationship to the second timer.

The active management system 102 is configured to communicate with and manage a plurality of network devices 106, 108. At step 302, the active management system 102 sends a communication confirmation request to each of the network devices 106, 108. At step 304, the active management system 102 receives a communication confirmation from each of the network devices 106, 108 that are communicatively coupled to the active management device 102. Steps 302 and 304 provide insight into the specific network devices 106, 108 that are communicatively coupled to the active management system 102. In the event of a communication connectivity failure between the active management system 102 and one or more network devices 106, 108, the one or more network devices 106, 108 affected by the communication connectivity failure will fail to send a communication confirmation response to the request for communication confirmation by the active management system 102.

An active communication status vector is maintained at the active management system 102. The active communication status vector reflects the communication status between the active management system 102 and each of the network devices 106, 108. At step 306, the active management system 102 updates the active communication status vector to reflect the communication status of each of the network devices 106, 108 with respect to the active management system 102. Since the active communication status vector details the communication status of each of the network devices 106, 108, the active communication status vector can be used to determine the number of network devices 106, 108 in communication with the active management system 102.

At step 308, the active management system 102 transmits the active communication status vector to the standby management system 104 and at step 310 the active management system 102 receives a standby communication status vector from the standby management system 104. The standby communication status vector details the communication status of each of the network devices 106, 108 with respect to the standby management system 104 so the standby communication status vector can be used to determine the number of network devices in communication with the standby management system 104.

At step 312 a determination is made regarding whether the active management system 102 is in communication with a fewer number of network devices 106, 108 than the standby management system 104. The active communication status vector is used to determine the number of network devices 102, 104 having communication connectivity with the active management system 102 and the standby communication status vector is used to determine the number of network devices 106, 108 having communication connectivity with the standby management system 104.

The active communication status vector includes an active takeover flag. If the active management system 102 determines that the number of network devices 106, 108 in communication with the active management system 102 is fewer than the number of network devices 106, 108 in communication with the standby management system 104, the active management system 102 issues a command to set the active takeover flag at step 314. The set active takeover flag indicates that the active management system 102 determined that the active management system 102 has a relatively inferior communication connectivity status compared to the standby management system 104. It is possible that the active takeover flag was set during a previous assessment of the active management system 102. In which case, the previously set active takeover flag remains set responsive to the command to set the active takeover flag. The method 300 then proceeds to step 320.

If the active management system 102 determines that the number of network devices in communication with the active management system 102 is not fewer than the number of network devices in communication with the standby management system 104, the active management system 102 issues a command to clear the active takeover flag at step 316. At this point, a determination has been made that the communication connectivity status of the active management system 102 is not relatively inferior to the communication connectivity status of the standby management system 104. The method 300 then proceeds to step 318.

It is possible that the active takeover flag was already in a cleared state at the time the command to clear the active takeover flag was issued. In which case, the active takeover flag remains clear. It is also possible that a potential communication connectivity problem was detected during the previous active management system assessment cycle and the active takeover flag was set during that cycle. And that the potential communication connectivity problem was resolved prior to the current active management system assessment cycle. In which case, the previously set active takeover flag is reset or cleared.

The standby communication status vector includes a standby takeover flag. When a standby management system 104 determines that the number of network devices 106, 108 in communication with the standby management system 104 is fewer than the number of network devices 106, 108 in communication with the active management system 102, the standby management system 104 issues a command to set the standby takeover flag. In other words, a set standby takeover flag indicates that the standby management system 104 has made a determination during the previous communication connectivity assessment cycle that the standby management system 104 has a relatively inferior communication connectivity status compared to the active management system 102. The standby takeover flag remains set so long as the number of network devices 106, 108 in communication with the standby management system 104 remains fewer than the number of network devices 106, 108 in communication with the active management system 102. The active management system 102 does not have the authority to set or reset the standby takeover flag.

As mentioned above, if the active management system 102 issued a command to set the active takeover flag at step 314, indicating that the active management system 102 had determined that the active management system 102 had a relatively inferior communication connectivity status compared to the standby management system 104, the method 300 proceeded to step 320. At step 320, the active management system 102 determines whether the received standby takeover flag has been set.

A set standby takeover flag indicates that the standby management system 104 had determined that the standby management system 104 had a relatively inferior communication connectivity status compared to the active management system 102 during a prior assessment cycle. A standby takeover counter maintained by the active management system 102 operates as a timer to define the period of time that the number of network devices 106, 108 in communication with the standby management system 104 has been fewer than the number of network devices 106, 108 in communication with the active management system 102.

If at step 320, the active management system 102 determines that the received standby takeover flag has been set. The set active takeover flag (set in step 314) during the current active management system assessment cycle indicates that the relative communication connectivity status appears to have changed from the perspective of the active management system 102. In other words, the communication connectivity status of the active management system 102 is now considered to be relatively inferior to the communication connectivity status of the standby management system 104 from the perspective of the active management system 102. This inconsistency between the communication connectivity assessment performed by the active management system 102 and the standby management system is typically a transitory condition. Examples of such transitory conditions include, but are not limited to, communication errors, communication latency, hardware, or software timing inconsistencies between the active management system 102 and the standby management system 104.

The active management system 102 issues a command to reset the standby takeover counter to zero at step 322. The active management system 102 does not have the authority to reset the standby takeover flag. The method 300 returns to step 302. In one embodiment, a predefined period of time is allowed to elapse before step 302 is repeated.

If the active management system 102 determines at step 320 that the standby takeover flag is not set the method 300 returns to step 302. In one embodiment, a predefined period of time is allowed to elapse before step 302 is repeated.

As mentioned above, if the active management system 102 issued a command to clear the active takeover flag at step 316, indicating that the active management system 102 was not in communication with a fewer number of network devices 106, 108 than the standby management system 104, the method 300 proceeded to step 318. At step 318, the active management system 102 determines whether the standby takeover flag has been set by the standby management system 104 A set standby takeover flag implies that the standby management system 104 determined during a previous communication connectively assessment cycle that the communication connectivity status of the standby management system 104 with respect to the network devices 106, 108 is relatively inferior when compared to the connectivity status of the active management system 102.

Since the active takeover flag was cleared at step 316, if the active management system 102 determines at step 318 that the received standby takeover flag is not set, this implies that the relative communication connectivity status of the active management system 102 is generally equivalent to the communication connectively status of the standby management system 104. The active management system 102 issues a command to reset the standby takeover counter at step 322. The method 300 returns to step 302. In one embodiment, a predefined period of time is allowed to elapse before step 302 is repeated.

It is possible that the standby takeover counter was already in a reset to a zero condition at the time the command to reset the standby takeover counter was issued. In which case, the standby takeover counter remains reset. It is also possible that a potential communication connectivity problem was detected during the previous active management system assessment cycle and the standby takeover counter was incremented during that cycle. And that the potential communication connectivity problem was resolved prior to the current active management system assessment cycle. In which case, the previously incremented standby takeover counter is reset to zero.

Since the active takeover flag was not set at step 316, if the active management system 102 determines at step 318 that received standby takeover flag is set, this implies that the communication connectivity status of the active management system 102 is relatively superior to the communication connectively status of the standby management system 104. The active management system 102 issues a command to increment the standby takeover counter by one at step 324. The standby takeover counter operates as a timer and defines the period of time that the number of network devices 106, 108 in communication with the standby management system 104 has been fewer than the number of network devices 106, 108 in communication with the active management system 102.

At step 326, the active management system 102 determines whether the standby takeover counter exceeds a predetermined value. The predetermined value is representative of a predetermined period of time. If the predetermined period of time has elapsed following the setting of the standby takeover flag, the standby management system 104 is considered to have communication connectivity issues with respect to the network devices 106, 108.

If the active management system 102 determines that the standby takeover counter does not exceed the predetermined value at step 326, the method 300 returns to step 302. In one embodiment, a predefined period of time is allowed to elapse before step 302 is repeated.

If the active management system 102 determines that the standby takeover counter exceeds the predetermined value, a log entry is made indicating that the standby management system 104 has communication connectivity issues with the network devices 106, 108 at step 328 and the administrator is alerted that the standby management system 104 has communication connectivity issues with the network devices 106, 108 at step 330. The method 300 returns to step 302. In one embodiment, a predefined period of time is allowed to elapse before step 302 is repeated.

While the steps in the method 300 have been described in a particular order, the steps may be performed in a different order and/or in parallel. Also fewer steps than those described or additional steps may be performed in addition to the described steps.

Figure 4:
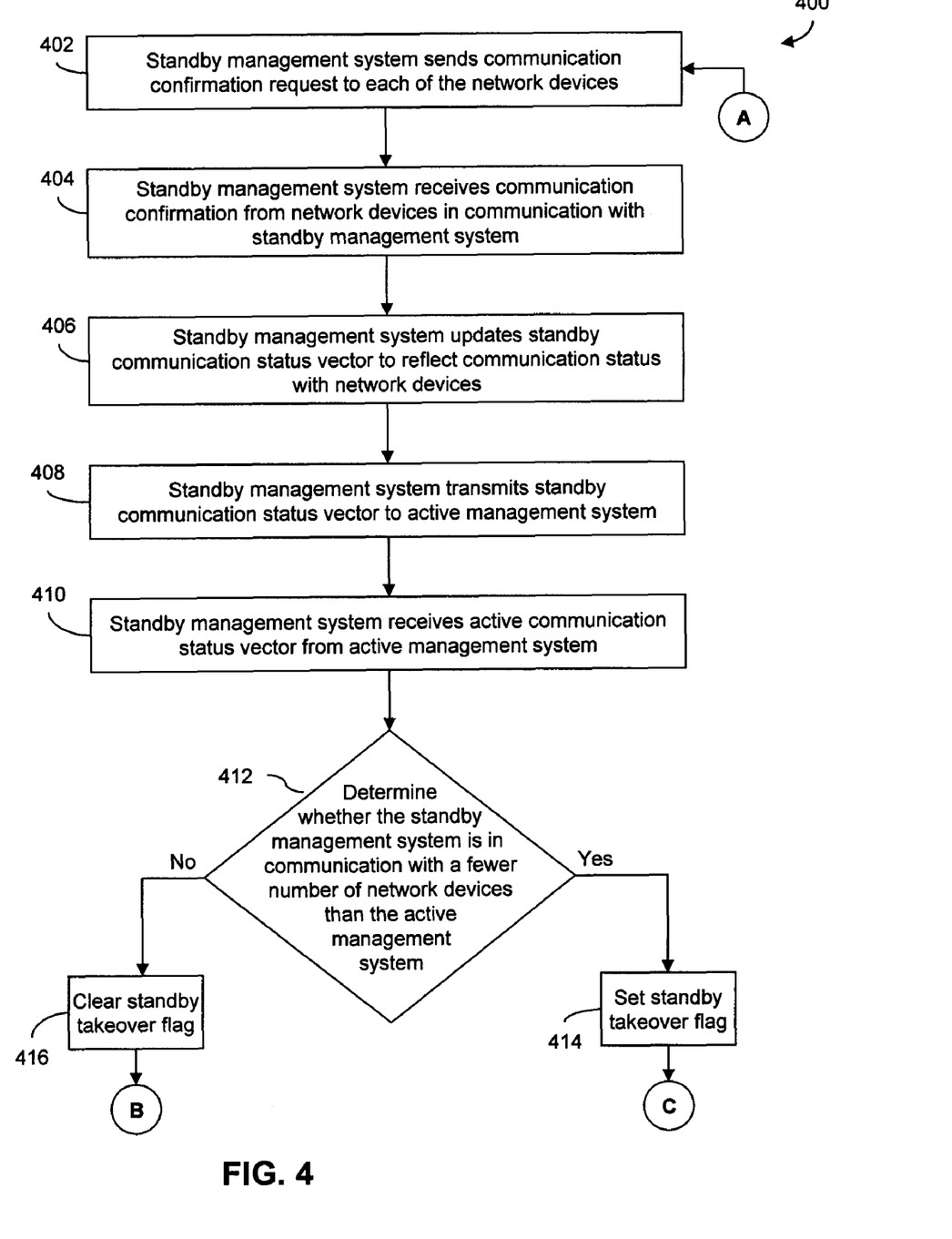
FIG. 4 is a flowchart representation of one embodiment of a method of managing network communications from a management system that has been placed in standby mode.

Referring to FIG. 4, a flowchart representation of one embodiment of a method 400 of managing network communications from a management system that has been placed in standby mode is shown. The standby management system 104 periodically polls the network devices 106, 108 to determine the communication connectivity status of the network devices 106, 108 with respect to the standby management system 104. The active management system 102 and the standby management system 104 periodically exchange communication connectivity data and the standby management system 104 assesses the communication connectivity status of the active management system 102 and the standby management system 104.

In one embodiment, the communication connectivity assessment is performed by the standby management system 104 every network device polling cycle. In one embodiment, the communication connectivity assessment is performed by the standby management system 104 following two of more network device polling cycles. In one embodiment, periodic communication connectivity assessment is performed at the standby management system 104 in accordance with a first timer and the standby management system 104 network device polling is performed in accordance with a second timer where the first timer bears an asynchronous timing relationship to the second timer.

The standby management system 102 is configured to communicate with the plurality of network devices 106, 108. At step 402, the standby management system 104 sends a communication confirmation request to each of the network devices 106, 108. At step 404, the standby management system 104 receives a communication confirmation from each of the network devices 106, 108 that are communicatively coupled to the standby management system 104. Steps 402 and 404 provide insight into the specific network devices 106, 108 that are communicatively coupled to the standby management system 104. In the event of a communication connectivity failure between the standby management system 104 and one or more network devices 106, 108, the one or more network devices 106, 108 affected by the communication connectivity failure will fail to send a communication confirmation response to the request for communication confirmation by the standby management system 104.

A standby communication status vector is maintained at the standby management system 104. The standby communication status vector reflects the communication status between the standby management system 104 and each of the network devices 106, 108. At step 406, the standby management system 104 updates the standby communication status vector to reflect the communication status of each of the network devices 106, 108 with respect to the standby management system 104. Since the standby communication status vector details the communication status of each of the network devices 106, 108, the standby communication status vector can be used to determine the number of network devices 106, 108 in communication with the standby management system 104.

At step 408, the standby management system 104 transmits the standby communication status vector to the active management system 102 and at step 410 the standby management system 104 receives the active communication status vector from the active management system 102. The active communication status vector details the communication status of each of the network devices 106, 108 with respect to the active management system 102 so the active communication status vector can be used to determine the number of network devices in communication with the active management system 102.

At step 412 a determination is made regarding whether the standby management system 104 is in communication with a fewer number of network devices 106, 108 than the active management system 102. The standby communication status vector is used to determine the number of network devices 102, 104 having communication connectivity with the standby management system 104 and the active communication status vector is used to determine the number of network devices 106, 108 having communication connectivity with the active management system 102.

The standby communication status vector includes a standby takeover flag. If the standby management system 104 determines that the number of network devices 106, 108 in communication with the standby management system 104 is fewer than the number of network devices 106, 108 in communication with the active management system 102, the standby management system 104 issues a command to set the standby takeover flag at step 414. The set standby takeover flag indicates that the standby management system 104 has determined that the standby management system 104 has a relatively inferior communication connectivity status compared to the active management system 102. It is possible that the standby takeover flag was set during a previous assessment of the standby management system 104. In which case, the previously set standby takeover flag remains set responsive to the command to set the standby takeover flag. The method 400 the proceeds to step 420.

If the standby management system 104 determines that the number of network devices 106, 108 in communication with the standby management system 104 is not fewer than the number of network devices in communication with the active management system 102, the standby management system 104 issues a command to clear the standby takeover flag at step 416. At this point, a determination has been made that the communication connectivity status of the standby management system 104 is not relatively inferior to the communication connectivity status of the active management system 102. The method 300 then proceeds to step 418.

It is possible that the standby takeover flag was already in a cleared state at the time the command to clear the standby takeover flag was issued. In which case, the clear standby takeover flag remains clear. It is also possible that a potential communication connectivity problem was detected during the previous active management system assessment cycle and the standby takeover flag was set during that cycle. And that the potential communication connectivity problem was resolved prior to the current standby management system assessment cycle. In which case, the previously set standby takeover flag is reset or cleared.

The active communication status vector includes an active takeover flag. When an active management system 102 determines that the number of network devices 106, 108 in communication with the active management system 102 is fewer than the number of network devices 106, 108 in communication with the standby management system 104, the active management system 102 issues a command to set the active takeover flag. In other words, a set active takeover flag indicates that the active management system 102 has made a determination during the previous communication connectivity assessment cycle that the active management system 102 has a relatively inferior communication connectivity status compared to the standby management system 104. The active takeover flag remains set so long as the number of network devices 106, 108 in communication with the active management system 102 remains fewer than the number of network devices 106, 108 in communication with the standby management system 104. The standby management system 104 does not have the authority to set or reset the active takeover flag.

As mentioned above, if the standby management system 104 issued a command to set the standby takeover flag at step 414, indicating that the standby management system 104 had determined that the standby management system 104 had a relatively inferior communication connectivity status compared to the active management system 102, the method 400 proceeded to step 420. At step 420, the standby management system 104 determines whether the received active takeover flag has been set.

A set active takeover flag indicates that the active management system 102 had determined that the active management system 102 had a relatively inferior communication connectivity status compared to the standby management system 104 during a prior assessment cycle. An active takeover counter maintained by the standby management system 104 operates as a timer to define the period of time that the number of network devices 106, 108 in communication with the active management system 102 has been fewer than the number of network devices 106, 108 in communication with the standby management system 104.

If at step 420, the standby management system 104 determines that the received active takeover flag has been set. The set standby takeover flag (set in step 414) during the current standby management system assessment cycle indicates that the relative communication connectivity status appears to have changed from the perspective of the standby management system 104. In other words, the communication connectivity status of the standby management system 104 is now considered to be relatively inferior to the communication connectivity status of the active management system 102 from the perspective of the standby management system 104. This inconsistency between the communication connectivity assessment performed by the standby management system 104 and the active management system 102 is typically a transitory condition. Examples of such transitory conditions include, but are not limited to, communication errors, communication latency, hardware, or software timing inconsistencies between the active management system 102 and the standby management system 104.

The standby management system 104 issues a command to reset the active takeover counter to zero at step 422. The standby management system 104 does not have the authority to reset the active takeover flag. The method 400 returns to step 402. In one embodiment, a predefined period of time is allowed to elapse before step 402 is repeated.

If the standby management system 104 determines at step 420 that the active takeover flag is not set the method 400 returns to step 402. In one embodiment, a predefined period of time is allowed to elapse before step 402 is repeated.

As mentioned above, if the standby management system 104 issued a command to clear the standby takeover flag at step 416, indicating that the standby management system 104 was not in communication with a fewer number of network devices 106, 108 than the active management system 102, the method 400 proceeded to step 418. At step 418, the standby management system 104 determines whether the active takeover flag has been set by the active management system 102. A set active takeover flag implies that the active management system 102 determined during a previous communication connectively assessment cycle that the communication connectivity status of the active management system 102 with respect to the network devices 106, 108 is relatively inferior when compared to the connectivity status of the standby management system 104.

Since the standby takeover flag was cleared at step 416, if the standby management system 104 determines at step 418 that the received active takeover flag is not set, this implies that the relative communication connectivity status of the standby management system 104 is generally equivalent to the communication connectively status of the active management system 102. The standby management system 104 issues a command to reset the active takeover counter at step 422. The method 400 returns to step 402. In one embodiment, a predefined period of time is allowed to elapse before step 402 is repeated.

It is possible that the active takeover counter was already in a reset to a zero condition at the time the command to reset the active takeover counter was issued. In which case, the active takeover counter remains reset. It is also possible that a potential communication connectivity problem was detected during the previous standby management system assessment cycle and the active takeover counter was incremented during that cycle. And that the potential communication connectivity problem was resolved prior to the current standby management system assessment cycle. In which case, the previously incremented active takeover counter is reset to zero.

Since the standby takeover flag was not set at step 416, if the standby management system 104 determines at step 418 that received active takeover flag is set, this implies that the communication connectivity status of the standby management system 104 is relatively superior to the communication connectively status of the active management system 102. The standby management system 104 issues a command to increment the active takeover counter by one at step 424. The active takeover counter operates as a timer and defines the period of time that the number of network devices 106, 108 in communication with the active management system 102 has been fewer than the number of network devices 106, 108 in communication with the standby management system 104.

At step 426, the standby management system 104 determines whether the active takeover counter exceeds a predetermined value. The predetermined value is representative of a predetermined period of time. If the predetermined period of time has elapsed following the setting of the active takeover flag, the active management system 102 is considered to have communication connectivity issues with respect to the network devices 106, 108.

If the standby management system 104 determines that the active takeover counter does not exceed the predetermined value at step 426, the method 400 returns to step 402. In one embodiment, a predefined period of time is allowed to elapse before step 402 is repeated.

If the standby management system 104 determines that the active takeover counter exceeds the predetermined value, a log entry is made indicating that the active management system 102 has communication connectivity issues with the network devices 106, 108 at step 428. The administrator is alerted that the active management system 102 has communication connectivity issues with the network devices 106, 108 and that failover will occur at step 430. At step 432, the standby management system 104 issues a failover command to the active management system 102. The standby management system 104 sets itself up in active management mode.

While the steps in the method 400 have been described in a particular order, the steps may be performed in a different order and/or in parallel. Also fewer steps than those described or additional steps may be performed in addition to the described steps.

Figure 5:
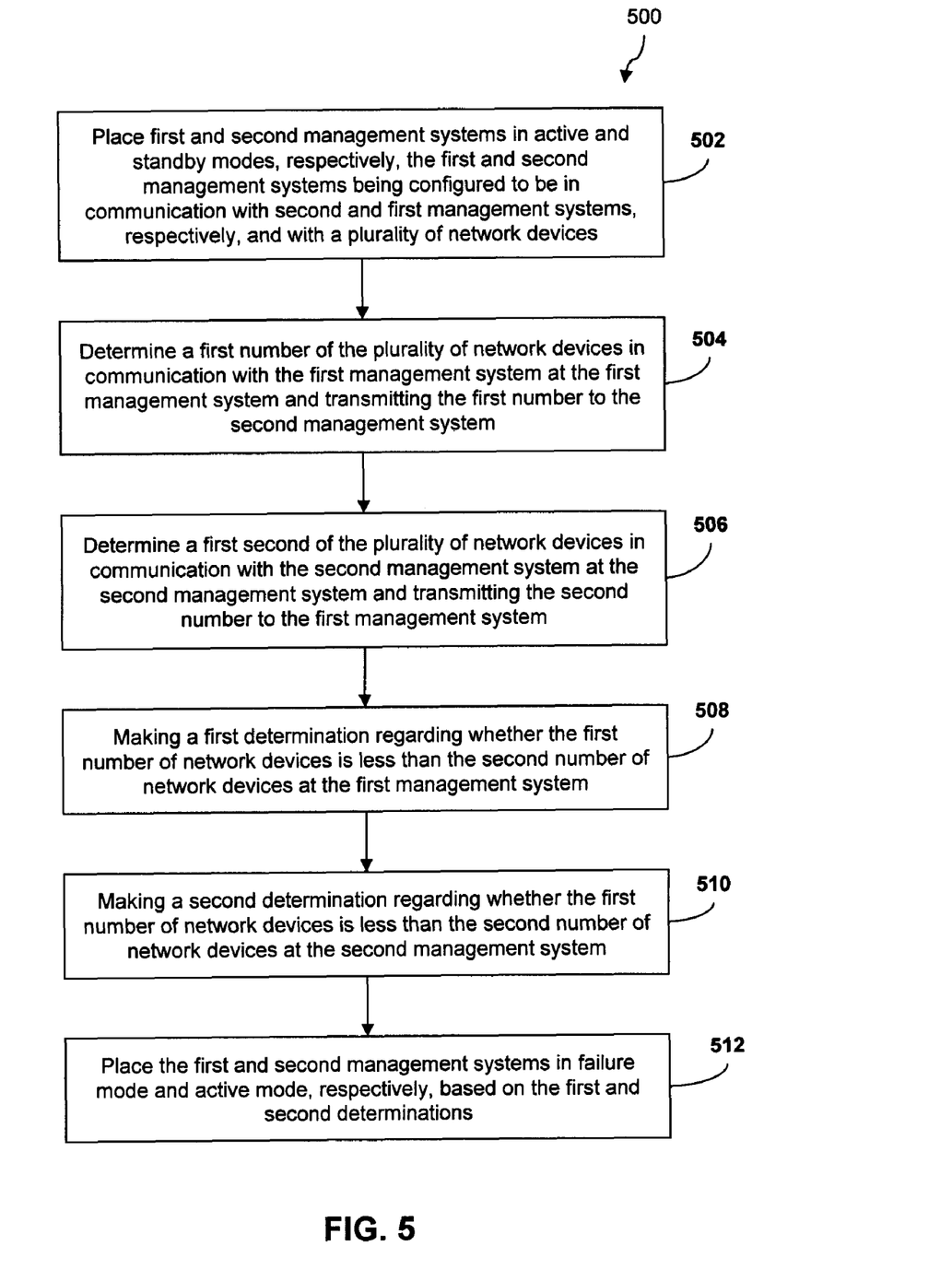
FIG. 5 is a flowchart representation of one embodiment of a method of managing network communications.

Referring to FIG. 5, a flowchart representation of one embodiment of a method 500 of managing network communications is shown. At step 502, a first management system 102 is placed in active mode and a second management system 104 is placed in standby mode where the first and second management systems 102, 104 are configured to communicate with the second and the first management systems 104, 102, respectively and with a plurality of network devices 106, 108. At step 504, a first number of the plurality of network devices 106, 108 in communication with the first management system 102 is determined at the first management system 102 and the first number is transmitted to the second management system 104. At step 506, a second number of the plurality of network devices 106, 108 in communication with the second management system 104 is determined at the second management system 104 and the second number is transmitted to the first management system 102. At step 508, a first determination is made regarding whether the first number of network devices is less than the second number of network devices at the first management system 102. At step 510, a second determination is made regarding whether the first number of network devices is less than the second number of network devices at the second management system 104. At step 512, the first and second management systems 102, 104 are placed in failure mode and in active mode, respectively based on the first and second determinations. While the steps in the method 500 have been described in a particular order, the steps may be performed in a different order or additional steps may be performed in addition to the described steps.

In one embodiment, a computer readable medium stores a computer executable program for managing network communications. The computer readable medium includes computer readable code for placing first and second management systems 102, 104 in active and standby modes, respectively, the first and second management systems 102, 104 being configured to be in communication with the second and the first management systems 104, 102, respectively and with a plurality of network devices 106, 108, computer readable code for determining a first number of the plurality of network devices 106, 108 in communication with the first management system 102 at the first management system 102 and for transmitting the determined first number to the second management system 104, computer readable code for determining a second number of the plurality of network devices 106, 108 in communication with the second management system 104 at the second management system 104 and for transmitting the determined second number to the first management system 102, computer readable code for making a first determination regarding whether the first number of network devices is less than the second number of network devices at the first management system 102, computer readable code for making a second determination regarding whether the first number of network devices is less than the second number of network devices at the second management system 104 and computer readable code for placing the first and second management systems 102, 104 in failure mode and in active mode, respectively based on the first and second determinations.

In one embodiment, a system for managing network communications includes a first management system 102, a second management system 104, a first network communication management module 210 at the first management system 102 and a second network management module at the second management system 104. The first management system 102 is operable to be configured to be in communication with a plurality of network devices 106, 108 and to be placed in an active mode. The second management system 104 is operable to be configured to be in communication with the plurality of network devices 106, 108 and with the first management system 102. The second management system 104 is operable to be placed in a standby mode. The first network communication management module 210 is operable to determine a first number of the plurality of network devices 106, 108 in communication with the first management system 102 and to issue a command to transmit the determined first number to the second management system 104. The second network communication management module 210 at the second management system 104 is operable to determine a second number of the plurality of network devices 106, 108 in communication with the second management system 104 and to issue a command to transmit the determined second number to the first management system 102. The first network communication management module 210 is further operable to make a first determination regarding whether the first number of network devices is less than the second number of network devices. The second network communication management module 210 is further operable to make a second determination regarding whether the first number of network devices is less than the second number of network devices. The second network communication management module 210 is operable to issue a first and second command to place the first and second management systems 102, 104 in failure mode and active mode, respectively based on the first and second determinations.

It should be noted that while systems implemented using software or firmware executed by hardware have been described above, those having ordinary skill in the art will readily recognize that the disclosed systems could be implemented exclusively in hardware through the use of one or more custom circuits, such as for example, application-specific integrated circuits (ASICs) or any other suitable combination of hardware and/or software.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

The invention claimed is:

1. A method of managing network communications, comprising:
   placing first and second management systems in active and standby modes, respectively, the first and second management systems being configured to be in communication with the second and the first management systems, respectively and with a plurality of network devices;
   determining a first number of the plurality of network devices in communication with the first management system at the first management system and transmitting the determined first number to the second management system;
   determining a second number of the plurality of network devices in communication with the second management system at the second management system and transmitting the determined second number to the first management system;
   making a first determination regarding whether the first number of network devices is less than the second number of network devices at the first management system;
   making a second determination regarding whether the first number of network devices is less than the second number of network devices at the second management system; and
   placing the first and second management systems in failure mode and active mode, respectively based on the first and second determinations.

2. The method of claim 1, further comprising issuing a failover command from the second management system to the first management system to place the first management system in failover mode thereby placing the second system in active mode based on the first and second determinations.

3. The method of claim 1, further comprising:
   transmitting the results of the first determination from the first management system to the second management system;
   verifying the results of the first determination by making the second determination at the second management system; and
   issuing a command from the second management system to the first management system to place the first management system in failover mode thereby placing the second management system in active mode.

4. The method of claim 1, further comprising:
   periodically updating the first number of the plurality of network devices in communication with the first management system at the first management system and transmitting the updated first number to the second management system;
   periodically updating the second number of the plurality of network devices in communication with the second management system at the second management system and transmitting the updated second number to the first management system;
   making a third determination regarding whether the first number of the plurality of network devices remains less than the second number of the plurality of network devices for a predetermined period of time, and
   wherein placing the first and second management systems in failure mode and active mode, respectively based on the first and second determinations comprises placing the first and second management systems in failure mode and active mode, respectively based on the first, second and third determinations.

5. The method of claim 1, further comprising:
   making a third determination regarding whether the second number of network devices is less than the first number of network devices at the first management system;
   making a fourth determination regarding whether the second number of network devices is less than the first number of network devices at the second management system; and
   issuing an alert to the administrator based on the third and fourth determinations.

6. The method of claim 1, further comprising maintaining a first management system communication status vector at the first management system, the first management system communication status vector identifying the specific network devices of the plurality of network devices in communication with the first management system.

7. The method of claim 1, further comprising maintaining a second management system communication status vector at the second management system, the second management system communication status vector identifying the specific network devices of the plurality of network devices in communication with the second management system.

8. The method of claim 1, wherein one of the plurality of network devices is selected from a group consisting of an interface device and a fabric device.

9. A computer readable storage medium for storing a computer executable program for managing network communications, comprising:
   computer readable code for placing first and second management systems in active and standby modes, respectively, the first and second management systems being configured to be in communication with the second and the first management systems, respectively and with a plurality of network devices;
   computer readable code for determining a first number of the plurality of network devices in communication with the first management system at the first management system and for transmitting the determined first number to the second management system;
   computer readable code for determining a second number of the plurality of network devices in communication with the second management system at the second management system and for transmitting the determined second number to the first management system;
   computer readable code for making a first determination regarding whether the first number of network devices is less than the second number of network devices at the first management system;
   computer readable code for making a second determination regarding whether the first number of network devices is less than the second number of network devices at the second management system; and
   computer readable code for placing the first and second management systems in failure mode and active mode, respectively based on the first and second determinations.

10. The computer readable storage medium of claim 9, further comprising computer readable code for issuing a failover command from the second management system to the first management system to place the first management system in failover mode thereby placing the second system in active mode based on the first and second determinations.

11. The computer readable storage medium of claim 9, further comprising:
   computer readable code for transmitting the results of the first determination from the first management system to the second management system;
   computer readable code for verifying the results of the first determination by making the second determination at the second management system; and
   computer readable code for issuing a command from the second management system to the first management system to place the first management system in failover mode thereby placing the second management system in active mode.

12. The computer readable storage medium of claim 9, further comprising:
   computer readable code for periodically updating the first number of the plurality of network devices in communication with the first management system at the first management system and transmitting the updated first number to the second management system;
   computer readable code for periodically updating the second number of the plurality of network devices in communication with the second management system at the second management system and transmitting the updated second number to the first management system;
   computer readable code for making a third determination regarding whether the first number of the plurality of network devices remains less than the second number of the plurality of network devices for a predetermined period of time, and
   wherein the computer readable code for placing the first and second management systems in failure mode and active mode, respectively based on the first and second determinations comprises computer readable code for placing the first and second management systems in failure mode and active mode, respectively based on the first, second and third determinations.

13. The computer readable storage medium of claim 9, further comprising:
   computer readable code for making a third determination regarding whether the second number of network devices is less than the first number of network devices at the first management system;
   computer readable code for making a fourth determination regarding whether the second number of network devices is less than the first number of network devices at the second management system; and
   computer readable code for issuing an alert to the administrator based on third and fourth determinations.

14. The computer readable storage medium of claim 9, further comprising computer readable code for maintaining a first management system communication status vector at the first management system, the first management system communication status vector identifying the specific network devices of the plurality of network devices in communication with the first management system.

15. The computer readable storage medium of claim 9, further comprising computer readable code for maintaining a second management system communication status vector at the second management system, the second management system communication status vector identifying the specific network devices of the plurality of network devices in communication with the second management system.

16. The computer readable storage medium of claim 9, wherein one of the plurality of network devices is selected from a group consisting of an interface device and a fabric device.

17. A system for managing network communications, the system comprising:
   a first management system operable to be configured to be in communication with a plurality of network devices, the first management system being operable to be placed in an active mode;
   a second management system operable to be configured to be in communication with the plurality of network devices and with the first management system, the second management system being operable to be placed in a standby mode;
   a first network communication management module at the first management system, the first network communication management module being operable to determine a first number of the plurality of network devices in communication with the first management system and to issue a command to transmit the determined first number to the second management system; and
   a second network communication management module at the second management system being operable to determine a second number of the plurality of network devices in communication with the second management system and to issue a command to transmit the determined second number to the first management system, and
   wherein the first network communication management module is operable to make a first determination regarding whether the first number of network devices is less than the second number of network devices, wherein the second network communication management module is operable to make a second determination regarding whether the first number of network devices is less than the second number of network devices, and wherein the second network communication management module is operable to issue a first and second command to place the first and second management systems in failure mode and active mode, respectively based on the first and second determinations.

18. The system of claim 17:

wherein the first network communication management module is operable to transmit the results of the first determination from the first management system to the second management system, wherein the second network communication module is operable to verify the results of the first determination by making the second determination at the second management system, and wherein the second network communication module is operable to issue a command from the second management system to the first management system to place the first management system in failover mode thereby placing the second management system in active mode.

19. The system of claim 17:

wherein the first network communication management module is operable to periodically issue a command to update the first number of the plurality of network devices in communication with the first management system and to issue a command to transmit the updated first number to the second management system, wherein the second network communication management module is operable to periodically issue a command to update the second number of the plurality of network devices in communication with the second management system and to issue a command to transmit the updated second number to the first management system;

wherein the second network communication management module is operable to makes a third determination regarding whether the first number of the plurality of network devices remains less than the second number of the plurality of network devices for a predetermined period of time, and wherein placing the second network communication module is operable to issue commands to place the first and second management systems in failure mode and active mode, respectively based on the first, second and third determinations.

20. The system of claim 17:

wherein the first network communication management module is operable to make a third determination regarding whether the second number of network devices is less than the first number of network devices, wherein the second network communication module is operable to make a fourth determination regarding whether the second number of network devices is less than the first number of network devices at the second management system, and wherein the first network communication management module is operable to issue an alert to the administrator based on the third and fourth determinations.

\* \* \* \* \*